US005903819A

United States Patent [19]

Romesburg

[11] Patent Number: 5,903,819

[45] Date of Patent: May 11, 1999

[54] NOISE SUPPRESSOR CIRCUIT AND ASSOCIATED METHOD FOR SUPPRESSING PERIODIC INTERFERENCE COMPONENT PORTIONS OF A COMMUNICATION SIGNAL

[75] Inventor: Eric Douglas Romesburg, Chapel Hill, N.C.

[73] Assignee: Ericsson Inc., Research Triangle Park, N.C.

[21] Appl. No.: 08/614,543

[22] Filed: Mar. 13, 1996

[51] Int. Cl.[6] .................... H04B 15/00

[52] U.S. Cl. .................... 455/63; 455/570; 455/297; 375/285; 375/346

[58] Field of Search .................... 375/254, 285, 375/346; 381/94, 71, 86; 455/63, 50.1, 67.3, 114–115, 99, 296, 297, 298–299, 303–304, 310, 501, 570

[56] References Cited

U.S. PATENT DOCUMENTS

| | | | |
|---|---|---|---|
| 4,243,935 | 1/1981 | McCool et al. | 324/77 |
| 4,525,870 | 7/1985 | Fukuhara et al. | 455/298 |
| 4,587,620 | 5/1986 | Niimi et al. | 455/296 |
| 4,716,373 | 12/1987 | Schulze | 328/165 |
| 5,018,088 | 5/1991 | Higbie | 364/574 |
| 5,208,837 | 5/1993 | Richey | 375/346 |
| 5,311,314 | 5/1994 | Gutsmann | 348/607 |

FOREIGN PATENT DOCUMENTS

| | | |
|---|---|---|
| 0 568 282 A3 | 11/1993 | European Pat. Off. . |
| 0 590 350 A3 | 4/1994 | European Pat. Off. . |
| 62-139423 | 6/1987 | Japan . |

*Primary Examiner*—Nguyen Vo

*Attorney, Agent, or Firm*—Jenkens & Gilchrist, P.C.; Robert H. Kelly

[57] ABSTRACT

A noise suppressor, and associated method, suppresses periodic noise components of a communication signal. The period of the periodic noise components of the communication signal is determined by correlating the communication signal with the communication signal, delayed by various delay amounts. Once the period of the noise component portion is determined, a periodic signal exhibiting a corresponding periodicity is generated and subtracted from the communication signal. The resultant, difference signal forms a noise-suppressed communication signal. When embodied in a radiotelephonic device, background noise formed of an engine sound caused by the running engine of a motor vehicle at which the radiotelephonic device is operated can be suppressed during operation of the noise suppressor.

13 Claims, 5 Drawing Sheets

NOISE SUPPRESSOR CIRCUIT AND ASSOCIATED METHOD FOR SUPPRESSING PERIODIC INTERFERENCE COMPONENT PORTIONS OF A COMMUNICATION SIGNAL

The present invention relates generally to the suppression of noise components of a communication signal. More particularly, the present invention relates to a time-domain, noise suppressor circuit, and associated method, which removes cyclical electrical noise out of a communication signal to improve the audio quality of the communication signal.

When embodied in a radiotelephone positioned in a motor vehicle, background cyclical noise caused, e.g., by the sound of a running engine while a user of the radiotelephone speaks into the phone, is suppressed. Once suppressed, the cyclical noise does not form a portion of the signal transmitted by the radiotelephone, thereby facilitating the transmission of a communication signal of high audio quality.

BACKGROUND OF THE INVENTION

A communication system is comprised, at a minimum, of a transmitter and a receiver interconnected by a communication channel. Communication signals formed at, or applied to, the transmitter are converted at the transmitter into a form to permit their transmission upon the communication channel. The receiver is tuned to the communication channel to receive the communication signals transmitted thereupon. Once received, the receiver converts, or otherwise recreates, the communication signal transmitted by the transmitter.

A radio communication system is a type of communication system in which the communication channel comprises a radio frequency channel formed of a portion of the electromagnetic frequency spectrum. A radio communication system is advantageous in that the transmitter and receiver need not be interconnected by way of wireline connections. As, instead, the communication channel is formed of a radio frequency channel, communication signals can be transmitted between the transmitter and the receiver even when wireline connections therebetween would be inconvenient or impractical.

The quality of communications in a communication system is dependant, in part, upon levels of noise superimposed upon the information signal transmitted by the transmitter to the receiver. Noise can be introduced upon the informational signal while being transmitted upon the communication channel, and once received at the receiver, at the transmitter. Noise can also be applied to the transmitter together with application to the transmitter of the information signal.

When the noise level of the signal provided to a listener positioned at the receiver is high relative to the informational signal, the audio quality of the signal provided to the listener is low. If the noise levels are too significant, the listener is unable to adequately understand the informational signal provided at the receiver. Noise can be either periodic or aperiodic in nature. Random noise and white noise are exemplary of aperiodic noise. While a human listener is generally able to fairly successfully "block out" aperiodic noise from an informational signal, periodic noise is sometimes more distracting to the listener.

Various manners by which to remove noise components superimposed upon an informational signal, or at least to improve the ratio of the level of the informational signal to the level of the noise, are sometimes utilized. For instance, filter circuits are sometimes used which filter or otherwise remove the noise components from a communication signal, both prior to transmission by a transmitter and also subsequent to reception at a receiver.

Conventional filter circuits include circuitry for filtering noise components superimposed upon an informational signal. A spectral subtraction process is performed during operation of some of such conventional filter circuits. The spectral subtraction process is performed, e.g., by execution of an appropriate algorithm by processor circuitry. While a spectral subtraction process is sometimes effective to reduce noise levels, a spectral subtraction process also introduces distortion upon the informational signal. In some instances, the distortion introduced upon the informational signal is so significant that the utility of such a process is significantly limited. A spectral subtraction process is inherently a frequency-domain process and therefore necessitates a potentially significant signal delay when converting a time domain signal received by circuitry utilizing such a process into the frequency domain. Also, because such a process typically utilizes fast Fourier transform techniques, the resolution permitted of practical circuitry which performs such a process is typically relatively low.

When the ratio of the level of the information signal is high relative to the level of the noise, such noise suppression process, in spite of these problems is typically fairly successful. However, when the ratio is high, there is also less of a need to perform noise suppression. Such a spectral subtraction process is therefore sometimes of a limited utility to significantly improve the quality of communications.

A radiotelephonic communication system is exemplary of a wireless communication system in which noise superimposed upon an informational signal affects the quality of communications transmitted during operation of the communication system. Noise can be superimposed upon the informational signal at any stage during the transmission and reception process including noise superimposed upon an informational signal prior to its application to the transmitter. Such noise can deleteriously affect the quality of communications.

A radiotelephonic device used in such a system is popularly utilized by a user when the user is also operating, or positioned in, a motor vehicle. Because no wireline connection is required between the radiotelephonic device and the infrastructure of a radiotelephonic communication system, communications can be effectuated between the radiotelephonic device and the infrastructure of a radiotelephonic communication system, communications can be effectuated between the radiotelephonic device and the infrastructure as the motor vehicle travels throughout any location encompassed by the infrastructure.

Conventional filter circuits, including those which perform a spectral subtraction process, can also be used to filter noise superimposed upon an informational signal applied to a radiotelephonic device. However, such conventional filter circuits sometimes introduce unacceptable levels of distortion upon the signal when it is filtered. Also, such conventional filter circuits are relatively slow and are of relatively low resolution as the spectral subtraction process is a frequency-domain process, typically utilizing fast Fourier transform techniques.

Noise having periodic characteristics is particularly problematical in radiotelephonic communication systems due to the popular utilization by users of radiotelephonic devices while operating motor vehicles. Engine sounds generated during operation of a motor vehicle can be superimposed upon an informational signal, i.e., a voice signal, formed when the user speaks into the microphone of the transmitter portion of the radiotelephonic device. Other noise generated by other noise sources, such as rotations of vehicular tires as the motor vehicle travels can also be superimposed upon the informational signal.

The engine sounds are periodic, having harmonic frequencies related to the frequencies at which the engine operates. The tire-rotation sounds are also periodic. Because the noise sometimes cannot be suppressed without introducing distortion upon the informational signal, decisions are sometimes made not to utilize a spectral subtraction process. By disabling or otherwise not utilizing circuitry which performs a spectral subtraction process, the periodic noise is not properly suppressed. Therefore, communication signals transmitted by the radiotelephonic device oftentimes are formed of, in addition to the informational signal, significant component portions caused by the superposition of the periodic noise signals upon the informational signals. Noise suppression circuitry forming a portion of receiver circuitry of the radiotelephonic system infrastructure also does not typically adequately remove or suppress such noise.

A manner by which to suppress periodic noise superimposed upon an informational signal would therefore be advantageous.

It is in light of this background information related to noise suppression circuitry and methods that the significant improvements of the present invention have evolved.

SUMMARY OF THE INVENTION

The present invention advantageously provides a manner by which to suppress periodic noise superimposed upon an information signal. By suppressing the periodic noise, the quality of the information signal provided to a listener is improved. A time-domain process is utilized, permitting noise suppression to be effectuated without significant signal delay and with high frequency resolution.

In one embodiment, a noise suppressor forms a portion of a transmitter to suppress periodic noise superimposed upon an information signal prior to its transmission by the transmitter. In another embodiment, the noise suppressor forms a portion of a receiver to suppress the periodic noise component of a communication signal received at the receiver.

The noise suppressor may, for example, form a portion of a radiotelephonic device, such as a radiotelephonic device operable in a motor vehicle. The radiotelephonic device is operable to communicate pursuant to a radiotelephonic communication system, such as a cellular communication system.

Periodic noise, such as the sound of the engine of the motor vehicle generated during its operation can be suppressed. Such noise forms periodic, background noise which is superimposed upon a voice signal when a user of the radio telephonic device speaks into the microphonic portion thereof. The noise suppressor determines the frequency of the periodic noise component and removes the noise component prior to transmission of the signal generated by the radiotelephonic device. In another embodiment, two or more periodic noise components, having different periodicities superimposed upon an informational signal are suppressed.

Because the periodic noise superimposed upon the voice signal is suppressed, the audio quality of a signal provided to a listener is of improved audio quality. Because the noise suppressor is able to suppress periodic noise, suppression of noise commonly affecting the communication quality of radiotelephonic communications can be removed, thereby to facilitate communications pursuant to a radiotelephonic communication system.

In these and other aspects, therefore, a noise suppressor, and an associated method, suppresses selected noise component portions of a receive signal having an informational component portion. A noise component estimator is coupled to receive at least a signal indicative of the received signal. The noise component estimator detects noise component portions of the receive signal which are generated by a source of periodic interference. A time-domain noise component signal is generated responsive thereto. A noise component subtractor is coupled to receive the time-domain signal indicative of the received signal and also to receive the noise component signal generated by the noise component detector. The noise component subtractor subtracts values of the time-domain noise component signal from the signal indicative of the receive signal and forms a noise-suppressed signal responsive thereto. The noise-suppressed signal is representative of the receive signal in which the noise component portions generated by the source of periodic interference are suppressed.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION

Figure 1:
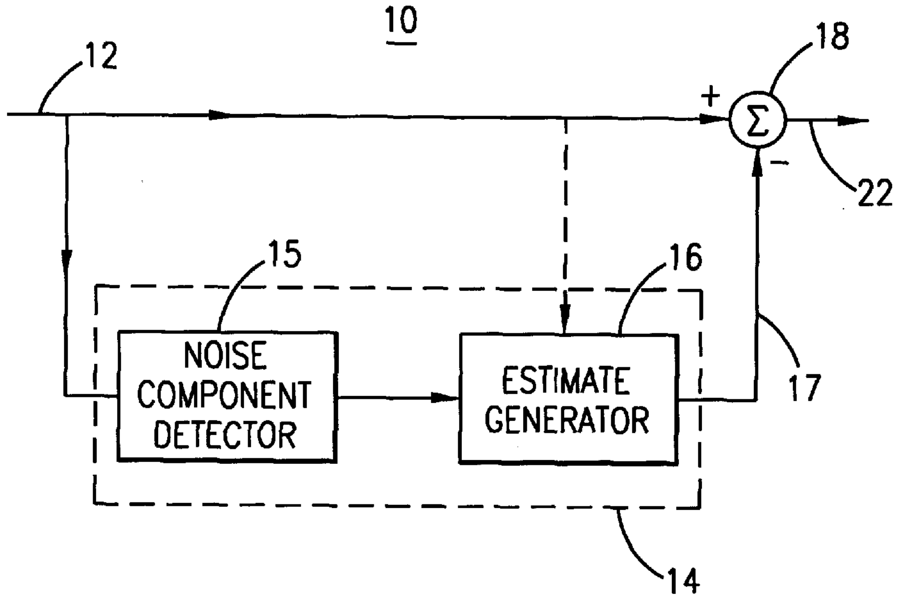
FIG. 1 illustrates a functional block diagram of a noise suppressor circuit of an embodiment of the present invention, operative to suppress periodic noise signals superimposed upon an information signal.

Referring first to FIG. 1, a noise suppressor, shown generally at 10, of an embodiment of the present invention is shown. The noise suppressor 10 receives a receive signal, here applied on line 12. The receive signal includes an information component portion upon which noise might be superimposed. Amongst the noise components which might be superimposed upon the information signal component portion of the receive signal is periodic noise, i.e., noise which is periodic in nature.

Conventional noise suppression circuitry is typically unable to adequately remove or otherwise suppress periodic noise component portions of a receive signal without introducing distortion upon the informational component portion thereof. The information signal, such as a voice signal, is formed of a plurality of periodic signals which, when summed together, form a complex harmonic signal, also periodic in nature.

Such conventional noise suppression circuitry such as those which utilize a spectral subtraction process, sometimes introduce unacceptable levels of distortion upon a receive signal and are not utilized for this purpose. Thereby, the periodic noise components are not suppressed. Because such periodic noise components are not suppressed, the audio quality of communications is adversely affected.

Because the noise suppressor 10 is operative to remove periodic noise components of a receive signal, utilization of the noise suppressor 10 in a communication system facilitates communication. Periodic noise component portions of the signal are removed or suppressed, and the information signal, when provided to a listener, is more readily discernible.

The noise suppressor 10 shown in FIG. 1 includes a noise component estimator 14 coupled to the line 12 to receive the receive signal applied thereon. The noise component estimator 14 includes a noise component detector 15 operative to detect the periodic noise component portions of the receive signal generated by a source of periodic interference and an estimate generator 16 which generates a signal on line 17 forming an estimate of the noise component detected by the estimator. The signal generated on line 17 at least either contains a noise component estimate or forms the noise component estimate. The estimator is operable in the time-domain to estimate a periodic noise component portion of the receive signal applied on line 12.

As shall be noted in greater detail with respect to embodiments described with respect to FIGS. 3 and 4 below, the noise component estimator is able to distinguish between periodic noise and an information signal, such as a voice signal, by selecting the rate, or speed, at which the estimator 14 is operable. As the frequency of the periodic noise signal might change over time, the estimator 14 is operable at a rate great enough to permit detection of such changes. The estimator 14, however, is not operable at a rate so great as to determine incorrectly that the information signal component portion of the receive signal forms the noise signal. That is to say, the rate at which the estimator 14 is operable is carefully selected so that the estimator 14 is able to detect and estimate the periodic noise as the frequency of the noise changes while also being able to distinguish between the noise and information signal.

The detector 15 is operative to detect a periodic noise component of the receive signal applied on line 12, and to provide indications of the detected component to the estimate generator 16. In one embodiment, the estimate generator is also coupled to receive the receive signal applied on line 12; such coupling is indicated in the Figure by the dashed-line extending to the estimate generator.

The estimate generator 16 of the noise component estimator 14 generates a noise component signal on line 17 which is representative of the periodic noise component portion of the receive signal, as detected by the detector 15. Line 17 is coupled to a negative input of a summing device 18. Line 12, upon which the receive signal is applied, is applied to a positive input terminal of the summer 18.

The summer 18 is operative to subtract the noise component signal generated on the line 17 from the receive signal applied to line 12 and to produce, responsive thereto, a noise-suppressed signal on line 22.

Because the summing device 18 is operative to subtract out the noise component signal generated by the noise component estimator 14 from the receive signal applied on line 12, the periodic noise detected by the noise component estimator is removed from the receive signal. Thereby, the periodic noise component is suppressed and does not form a portion of the noise-suppressed signal generated on the line 22.

When the noise suppressor 10 forms a portion of a transmitter, the periodic noise is removed prior to transmission of a communication signal generated by the transmitter. And, when the noise suppressor 10 forms a portion of a receiver, the periodic noise component portion of the signal received by the receiver is suppressed before the signal is provided to a listener positioned at the receiver.

Figure 2:
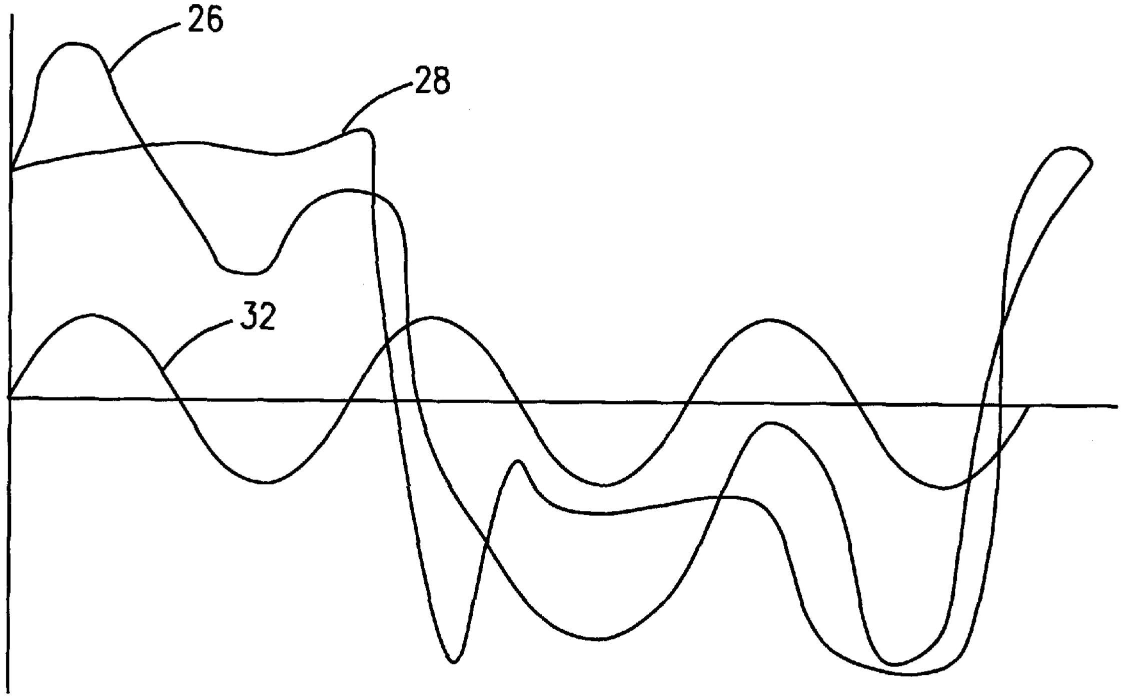
FIG. 2 illustrates a graphical representation of an information signal, a periodic noise signal, and a resultant signal formed when the noise signal is superimposed upon the information signal.

FIG. 2 illustrates an exemplary communication signal 26 formed of an information signal 28 upon which a periodic noise signal 32 is superimposed. When the noise signal 32 is superimposed upon the information signal 28, the combined signal 26 includes distortion caused by such noise signal 32. Conversely, by removing the periodic noise component portion out of the signal 26, the information signal 28 remains. When such a signal is provided to a listener, the audio quality of such a signal is improved relative to the quality of the combined signal 26.

Figure 3:
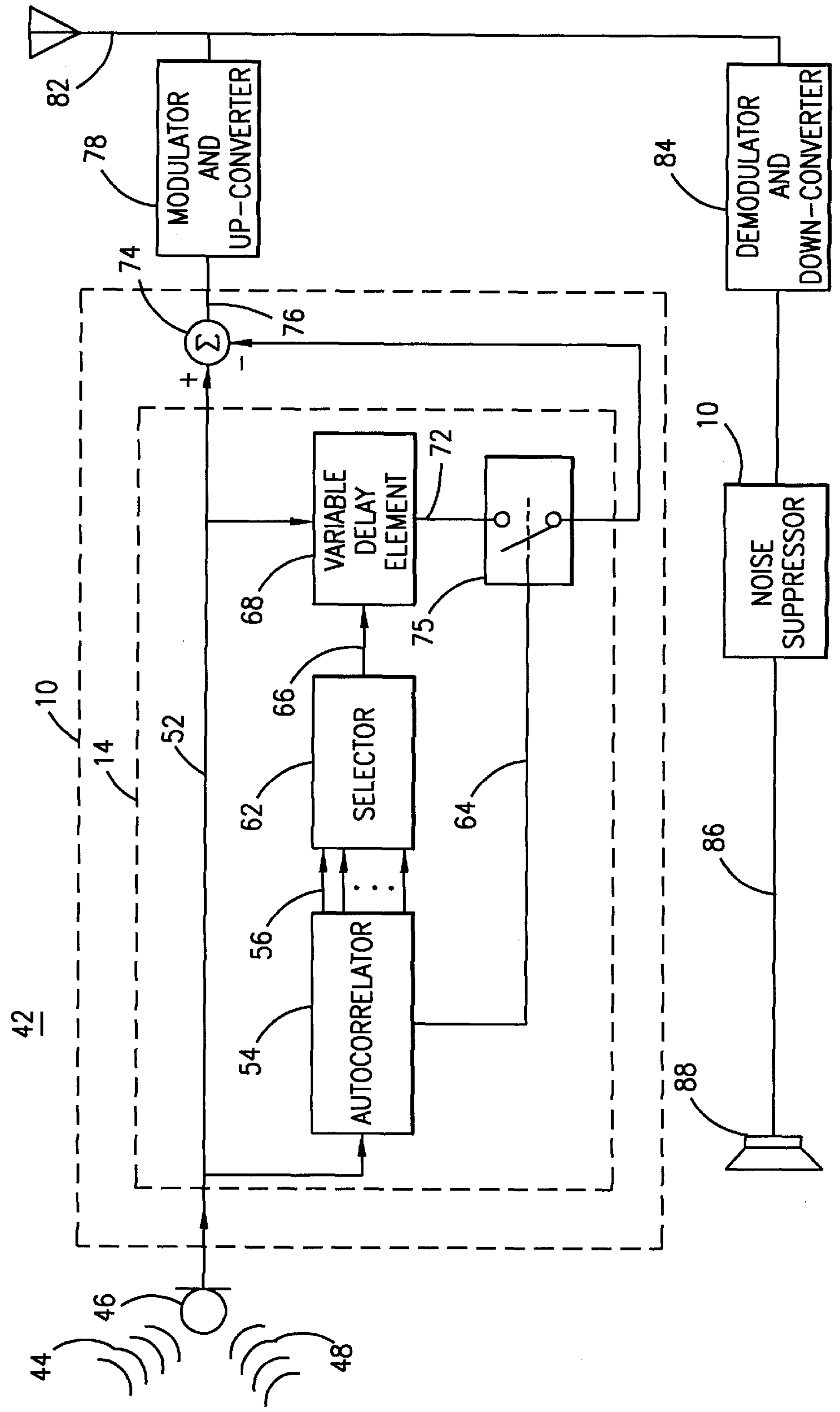
FIG. 3 illustrates a functional block diagram of the noise suppressor of an embodiment of the present invention coupled to a transmitter portion of a radiotelephonic device to form a portion thereof.

FIG. 3 illustrates a radiotelephone, shown generally at 42 which includes the noise suppressor 10 as a portion thereof. An operator of the radiotelephone 42 generates an acoustic information signal 44 when the user speaks into the microphone 46 of the phone 42. Periodic background noise 48, such as that formed of the sound of a running engine of a motor vehicle when the user utilizes the radiotelephone 42 when positioned at or in the motor vehicle is also applied to the microphone 46 of the phone 42.

Therefore, both the information signal 44 and the periodic background noise 48, are applied to the microphone 46. The acoustic information signal 44 and the background noise 48 together form a receive signal and are together applied to the microphone 46.

The microphone 46 converts the receive signal formed of signal 44 and the noise 48 into electrical form. An electrical signal indicative of the receive signal applied to the microphone 46 is generated on the line 52. The signal generated on the line 52 includes components formed of both an information, e.g., voice, signal and background noise.

The noise suppressor 10 shown previously in FIG. 1 is coupled to receive the electrical signal generated on the line 52. The noise suppressor 10 is again shown to include a noise component estimator 14.

The noise component estimator 14 is here shown to include an autocorrelator 54 which autocorrelates portions of the electrical signal supplied thereto by way of line 52. That is to say, the autocorrelator compares portions of the electrical signal applied thereto with the electrical signal delayed by an amount of delay. The autocorrelator determines the correlation between the electrical signal and the electrical signal which has been delayed.

In the illustrated embodiment, the autocorrelator 54 correlates the electrical signal generated on the line 52 with the same signal delayed by a plurality of different amounts of delay and generates autocorrelation signals on lines 56 indicative of the determined correlation between the electrical signal and the signal delayed by the plurality of amounts of delay.

The lines 56 are coupled to a sorter 62 to provide the autocorrelation signals generated by the autocorrelator 54 and the delays associated with the corresponding delayed signal thereto. The sorter 62 determines which of the autocorrelation signals is of a greatest value, here indicative of the delayed signal which correlates most closely with the electrical signal generated on the line 52. In another embodiment, and as shall be noted with respect to FIG. 5 below, the sorter 62 further determines which additional delayed signals correlate closely with the electrical signal generated on the line 52.

The autocorrelator 54 is further operative to generate an enable signal on the line 64 when the determined level of correlation between the electrical signal and at least one of the delayed signals is at least as great as a selected amount.

By determining the correlation between the electrical signal and the signal when delayed by various amounts of delay, a determination is made as to when the electrical signal repeats itself. Viz., the autocorrelator determines the period of the electrical signal. By suitable selection of the time constant of the autocorrelator, the period of the noise signal is determined. The sorter 62 selects the autocorrelation signal, and the time delay associated with the time delay of the delayed electrical signal which exhibits the greatest correlation with the electrical signal, and the sorter generates a delay signal on line 66 representative of the time delay and, hence, period of the noise component of the electrical signal. In another embodiment, the sorter 62 generates signals representative of the time delays of more than one noise component.

The autocorrelator 54 and the selector 62 together form the detector 15, shown previously in FIG. 1 as part of the estimator 14. Line 66 is coupled to a variable delay element 68 to provide the delay amount signal generated by the sorter thereto. The variable delay element is also coupled to the line 52 to receive the electrical signal generated thereon. The variable delay element 68 is operative to delay the electrical signal by an amount corresponding to the delay amount indicated by the value of the delay amount signal generated on the line 66. The variable delay element 68 forms the estimate generator 16, shown previously in FIG. 1 as part of the estimator 14.

The variable delay element 68 generates a delayed signal on line 72 which is provided to a negative input of a summer 74 when a switch 75 is positioned in a closed position. The signal generated on line 72 by the delay element 68 contains a noise estimate. The switch 75 is selectively actuatable into the closed position depending upon the value of the enable signal generated on line 64. In such manner, the delayed signal is applied to the negative input of the summer 74 only in instances in which the autocorrelator determines a correlation between the electrical signal and a delayed signal greater than the selected level. In an embodiment in which signals representative of more than one noise component are generated by the sorter 62, and as shall be noted more fully with respect to FIG. 5 below, additional variable delay elements, similar to the element 68, are operative in manners analogous to operation of the delay element 68, and signals generated by such additional elements are summed together, and such resultant sum is thereafter utilized in noise suppression activities.

The line 52 is coupled to a positive input of the summer 74, thereby to provide the electrical signal to the positive input thereof. The summer 74 is operative to subtract out the delayed signal from the electrical signal and to generate a difference signal which forms a noise-suppressed signal at an output terminal of the summer 74. The output terminal of the summer is coupled to line 76. In such manner, the periodic electrical noise component of the electrical signal is subtracted out of the electrical signal.

Thereafter, the noise-suppressed signal generated on line 76 is provided to modulation and up-conversion circuitry 78 which modulates and up-converts the noise-suppressed signal. Once modulated and up-converted in frequency, the noise-suppressed signal is thereafter transmitted by way of an antenna 82.

The radiotelephone 42 is further shown to include a receiver portion. A noise suppressor circuit 10, here shown by a single block, is utilized to remove periodic noise components of a signal received at the antenna 82 of the radio telephone once demodulated and down-converted by a demodulator and down-converter 84.

A noise-suppressed signal generated by the noise suppressor 10 on line 86 is provided to a speaker 88 to provide the signal to a listener positioned at the radiotelephone.

Figure 4:
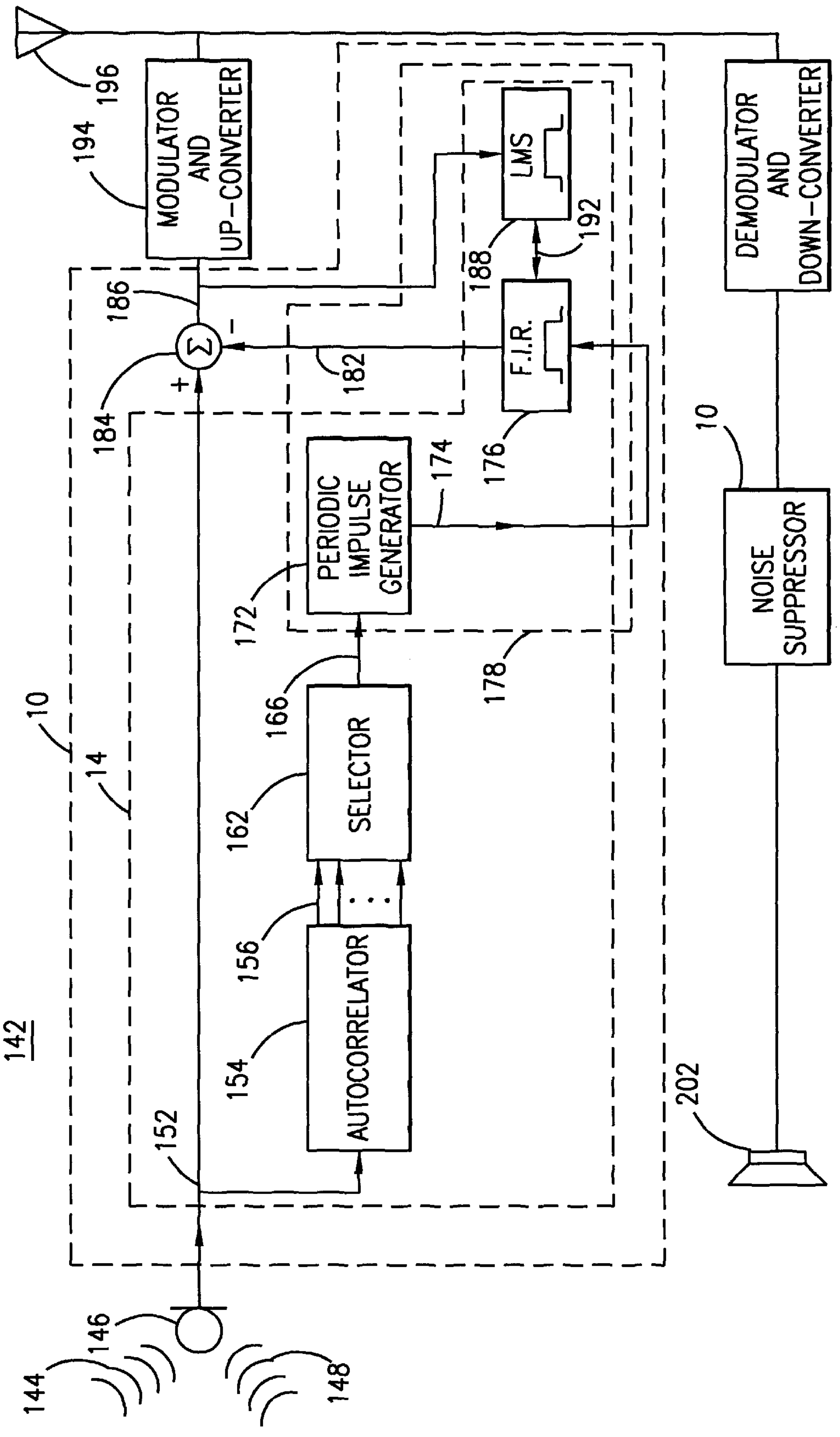
FIG. 4 illustrates a functional block diagram of a noise suppressor of another embodiment of the present invention, also coupled to the transmitter portion of a radiotelephonic device to form a portion thereof.

FIG. 4 illustrates a radiotelephone 142 of another embodiment of the present invention. The radiotelephone 142 includes a noise suppressor 10 of another embodiment of the present invention to suppress periodic noise signals prior to their transmission by the transmitter of the radiotelephone.

An acoustic signal 144 is applied to a microphone 146 together with background noise 148 which, for example, also may be generated by the same source as that which generated the background noise 48 shown in FIG. 3. The acoustic signal 144 together with the background noise 148 together form a receive signal which, when applied to the microphone 146 is converted into electrical form as an electrical signal on line 152.

The line 152 is coupled to an autocorrelator 154 of the noise component detector 10. The autocorrelator 154 forms a portion of the noise component detector 14 of the noise suppressor and is operative in manners analogous to operation of the autocorrelator 54 described with respect to FIG. 3.

The autocorrelator generates autocorrelation signals on the lines 156 which are applied to a sorter 162. The sorter 162 is operative in manners analogous to operation of the sorter 62 shown in FIG. 3 to generate a delay amount signal on line 166. The autocorrelator 154 and the sorter 162 together form the detector 15, shown previously in FIG. 1. In another embodiment, as shall be noted with respect to FIG. 5 below, the sorter 162 further determines which additional delayed signals correlate closely with the electrical signal generated on the line 152 and to generate signals indicative of such determinations.

Line 166 is coupled to a periodic impulse generator 172, thereby to provide the delay amount signal generated on the line 166 thereto. The periodic impulse generator 172 is operative to generate an impulse train on line 174 at a frequency responsive to the value of the delay amount signal generated on line 166.

Line 174 is coupled to an input of a finite impulse response (FIR) filter 176. The FIR filter 176 is an adaptive filter which adaptively filters the periodic impulse train applied thereto. The periodic impulse generator 172 and the FIR filter 176 together define a periodic interference signal estimate generator 178 which generates a periodic interference signal estimate. The estimate is generated on line 182 which is coupled to an output terminal of the filter 176. A plurality of periodic interference signal estimate generators can be positioned in parallel and signals generated therefrom summed together in an embodiment operative to suppress a plurality of periodic noise components.

The line 182 is coupled to a negative input of a summer 184. The line 152 is coupled to a positive input of the summer 184. The summer 184 is operative to subtract the periodic interference estimate signal generated on the line 182 from the electrical signal generated on the line 152. The summer generates a difference signal at an output terminal thereof. The difference signal forms a noise-suppressed signal which is generated on line 186 coupled to the output terminal of the summer. Line 186 is coupled to an input of a least mean square (LMS) adaptive filter 188. The filter 188 is operative to generate signals on line 192 to adaptively select the adaptive characteristics of the filter 176, in conventional manner.

The line 186 is further coupled to a modulator and up-converter 194 which modulates and up-converts the noise-suppressed signal. Once modulated and up-converted in frequency, the noise-suppressed signal is transmitted by the antenna 196.

The radiotelephone 142 is further shown to include receiver circuitry of which the noise suppressor 10 again forms a portion. The noise suppressor 10 is shown as a single block positioned in line with a demodulator and a down-converter circuit 198. The demodulator and down-converter 198 demodulates and down-converts a receive signal received at the antenna 196 and converted into electrical form thereat. A noise-suppressed signal generated by the noise suppressor 10 is applied to a speaker element 202 through which the noise-suppressed receive signal is provided, in acoustic form, to a listener of the radiotelephone.

Figure 5:
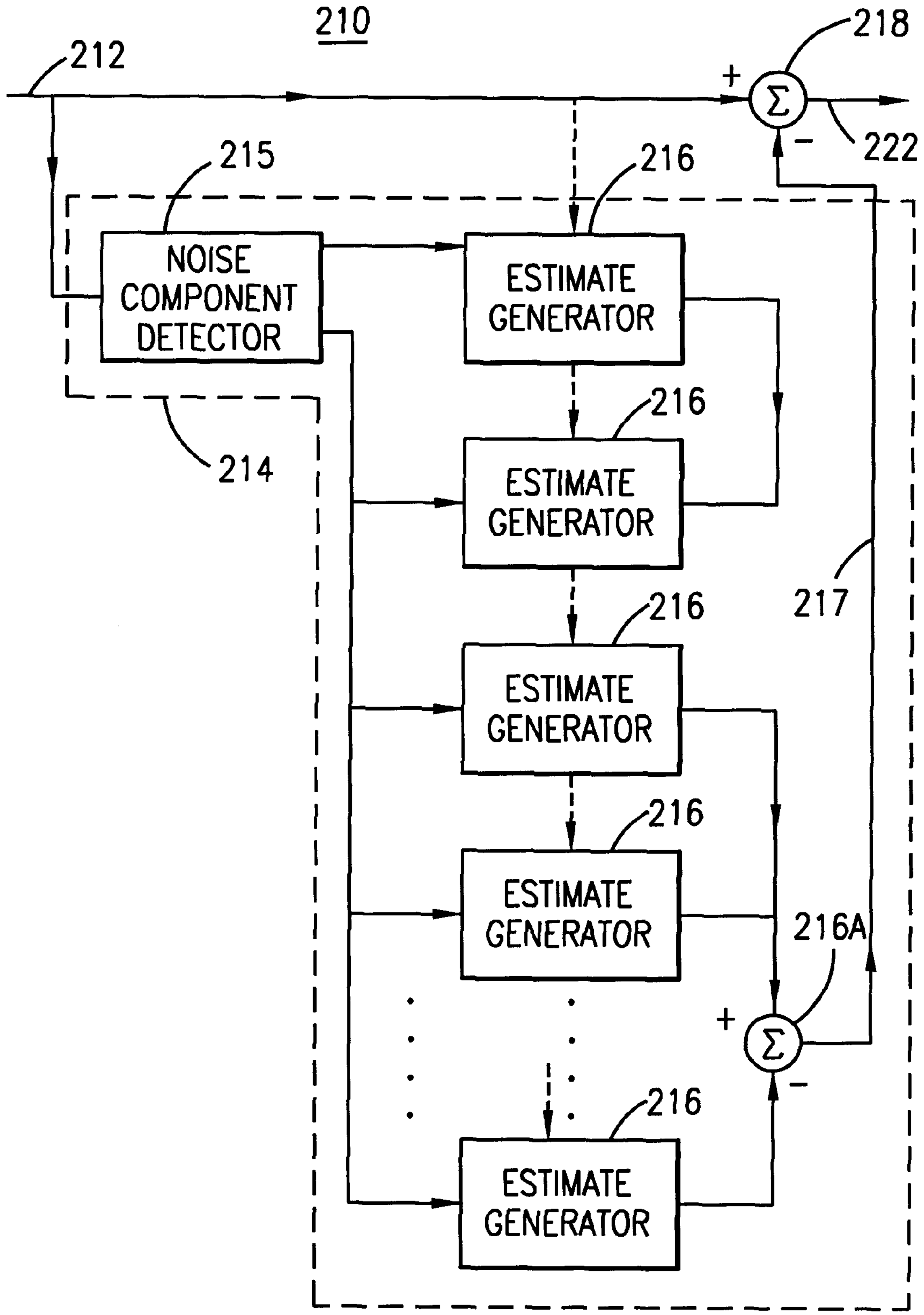
FIG. 5 illustrates a functional diagram of a noise suppressor circuit of another embodiment of the present invention, operative to suppress periodic noise signals superimposed upon an information signal.

FIG. 5 illustrates a noise suppressor, shown generally at 210, of another embodiment of the present invention. The noise suppressor 210 receives a receive signal, here applied on line 212. The receive signal includes an information component portion upon which noise might be superimposed, such as a periodic noise signal. Periodic noise component portions of the signal applied on line 212 are removed or suppressed, thereby to permit an information signal, also forming a portion of the receive signal, to be more readily discernable. The noise suppressor 210 includes a noise component estimator 214 coupled to the line 212 to receive the receive signal applied thereon. The noise component estimator includes a noise component detector 215 and a plurality of estimate generators 216. Individual ones of the estimate generators 216 are coupled to individual ones of a plurality of lines upon which signals generated by the noise component detector 215 are generated. In one embodiment, the estimate generators 216 are also coupled to the line 212; such couplings are indicated in the Figure by the dashed-lines extending to the estimate generators 216. Signals generated by the plurality of estimate generators are summed together by a summer 216A. A summed signal generated by the summer 216A is coupled to line 217 upon which the summed signal generated by the summer 216A is generated.

The detector 215 is operative to detect periodic noise components of the receive signal applied on line 212, and to provide indications of the detected components to the estimate generators 216. Separate ones of the detected noise components detected by the detector 215 are supplied to separate ones of the estimate generators 216.

Each of the estimate generators 216 generates a noise component signal, and the noise component signals generated by the estimate generators 216 are summed together by the summer 216A. The resultant sum is generated on line 217; such resultant sum is representative of the periodic noise component portions of the receive signal, as detected by the detector 215. Line 217 is coupled to a negative input of a summer 218. Line 212, upon which the receive signal is applied, is applied to a positive input terminal of the summer 218.

The summer 218 is operative to subtract the noise component signal generated on the line 217 from the receive signal applied to line 212 and to produce, responsive thereto, a noise-suppressed signal on line 222. Because the summing device 218 is operative to subtract out the noise component signal generated by the noise component estimator 214 from the receive signal, the periodic noise detected by the noise component estimator is removed from the receive signal. Thereby, the periodic noise component is suppressed and does not form a portion of the noise-suppressed signal generated on the line 222.

As mentioned briefly earlier with reference to the descriptions of FIGS. 3 and 4 above, the illustrated components of the suppressor 10 can be altered to suppress more than one noise component portion of a receive signal. That is to say, the suppressor 210 shown in FIG. 5 can be substituted for the noise suppressor 10. For instance, the selector 62 can generate a plurality of output signals on a plurality of output lines, analogous to the line 66, to be applied to a plurality of variable delay elements 68, each coupled also to the line 52. Signals generated by the plurality of variable delay elements 68 are summed together, thereafter to be applied to the summer 74. The noise suppressor 10 shown in FIG. 4 can analogously be altered, similarly to permit suppression of a plurality of different noise component portions out of a receive signal.

Figure 6:
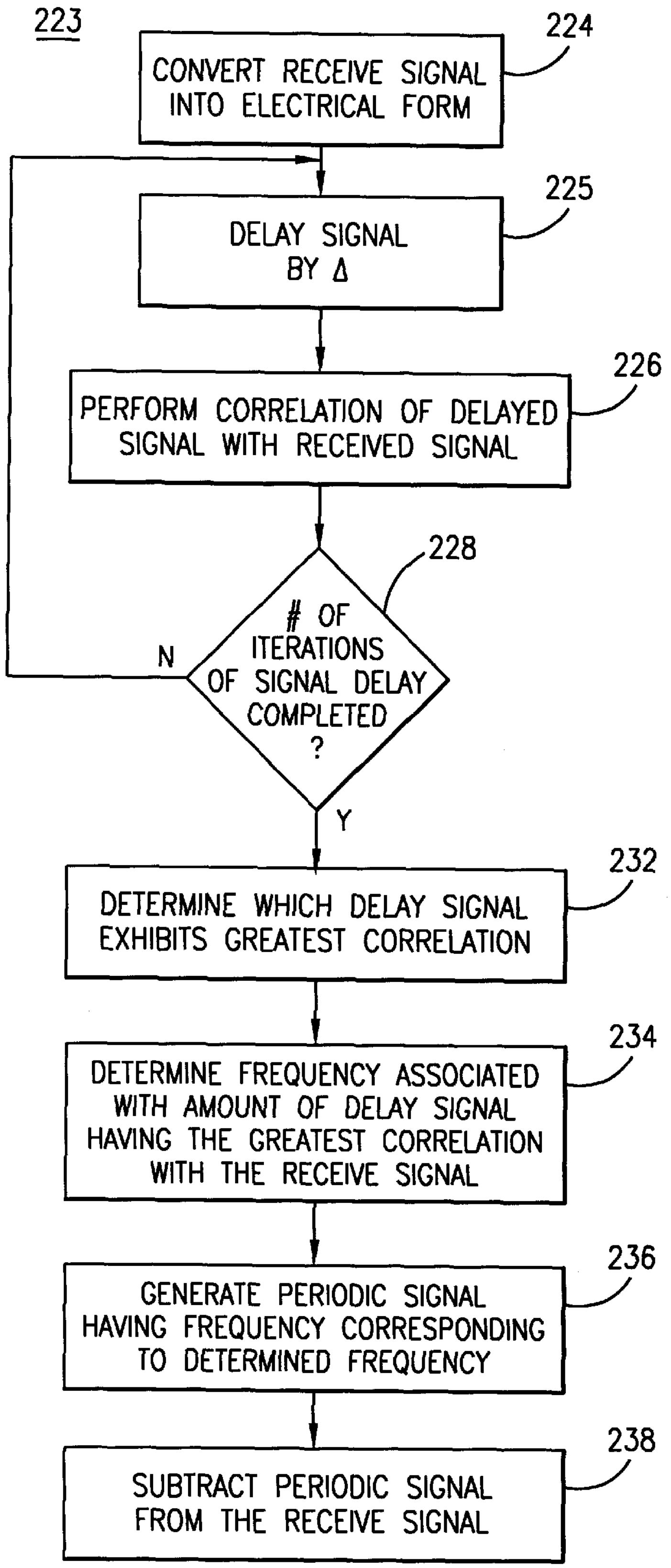
FIG. 6 illustrates a flow diagram listing the method steps of the method of an embodiment of the present invention.

FIG. 6 illustrates a method, shown generally at 223, of an embodiment of the present invention. The method 223 suppresses at least a selected noise component portion of a receive signal having an informational component portion.

First, and as indicated by the block 224, the receive signal is converted into electrical form. Thereafter, and as indicated by the block 225, the receive signal is delayed by a time delay. Then, and as indicated by the block 226, the delayed signal is correlated with the receive signal to indicate the level of autocorrelation between the delayed signal and the receive signal.

As indicated by decision block 228, a plurality of autocorrelations are performed by correlating the receive signal with delayed signals delayed by a plurality of different delay amounts. A no branch is taken from the decision block 228 until a desired number of iterations of correlations with a plurality of delayed signals have been performed.

Once the selected number of autocorrelations have been performed, the yes branch is taken from the decision block 228 to block 232 whereat a determination is made as to which delay signal exhibits the greatest correlation with the receive signal. The time delay, and hence, period of the noise component superimposed upon the informational signal component of the receive signal is thereafter determined, as indicated by the block 234.

Then, and as indicated by the block 236, a periodic signal having a periodicity corresponding to the period determined at block 234 is generated. The generated periodic signal is subtracted from the receive signal, as indicated by block 238, thereby to form a noise-suppressed signal in which the periodic noise component of the receive signal is suppressed therefrom.

Operation of the present invention advantageously suppresses periodic noise components of a communication signal. When embodied in a radiotelephonic device operated in a motor vehicle, background noise, such as that generated by the engine sound of a running engine of the motor vehicle is suppressed through operation of the noise suppressor. As a result of such noise-suppression, the quality of communications effectuated during operation of the radiotelephonic device can be improved.

The previous descriptions are of preferred examples for implementing the invention, and the scope of the invention should not necessarily be limited by this description. The scope of the present invention is defined by the following claims.

What is claimed is:

1. A noise suppressor for suppressing selected noise component portions of a receive signal having an informational component portion, said noise suppressor comprising:

a noise component estimator coupled to receive at least a signal indicative of the receive signal, said noise component estimator for estimating time-domain periodic noise component portions of the receive signal which are generated by at least one source of periodic interference and for generating a time-domain noise component estimate signal responsive thereto, said noise component estimator including an autocorrelator for correlating the signal indicative of the received signal with the signal indicative of the received signal delayed by a plurality of delay periods, the autocorrelator further for generating a plurality of autocorrelations signals of values indicator of autocorrelations therebetween, said noise component estimator further including a sorter coupled to receive the autocorrelation signals, the sorter for determining which of the autocorrelation signals applied thereto, and the time delay associated therewith, correlates most closely with the signal indicative of the received signal, and for generating a delay amount signal responsive thereto; and a noise component subtractor coupled to receive the signal indicative of the receive signal and to receive the time-domain noise component estimate signal generated by said noise component estimator, said noise component subtractor for subtracting values of the time-domain noise component estimate signal from the signal indicative of the receive signal and for forming a noise-suppressed signal responsive thereto, the noise-suppressed signal representative of the receive signal in which the noise component portions generated by the source of periodic interference are suppressed.

2. The noise suppressor of claim 1 wherein said sorter determines which of the autocorrelation signals applied thereto correlates with the signal indicative of the receive signal at greater than a selected correlation level, and for generating delay amount signals responsive thereto.

3. The noise suppressor of claim 1 wherein said noise component estimator further comprises a signal delayer coupled to receive the signal indicative of the receive signal and the delay amount signal, said signal delayer for generating a delayed signal formed of the signal indicative of the receive signal, delayed by a signal delay responsive to the delay amount signal, the delayed signal forming the noise component estimate signal estimating the noise component portions of the receive signal.

4. The noise suppressor of claim 3 wherein the noise component estimate signal is provided to said noise component subtractor when the autocorrelation signal selected by said sorter is at least as great as a selected autocorrelation signal value.

5. The noise suppressor of claim 1 wherein said noise component estimator further comprises a periodic signal generator coupled to receive the delay amount signal generated by said sorter, said periodic signal generator for generating a periodic signal having a periodicity related to a value of the delay amount signal, the periodic signal forming the noise component estimate signal.

6. The noise suppressor of claim 5 wherein said periodic signal generator comprises a periodic impulse generator coupled to receive the delay amount signal, said pulse impulse generator for generating an impulse train, and an adaptive filter coupled to receive the impulse train, said adaptive filter for generating a filtered signal, said filtered signal forming the noise component estimate signal.

7. The noise suppressor of claim 1 wherein said noise component subtractor comprises a summer having a first input terminal, a second input terminal, and an output terminal, the first input terminal coupled to receive the signal indicative of the receive signal, the second input terminal coupled to receive the noise component estimate signal, and wherein the noise-suppressed signal is formed at the output terminal.

8. The noise suppressor of claim 1 wherein said noise component estimator comprises a processor having algorithms executable therein for detecting the noise component portions of the receive signal generated by the source of periodic interference.

9. The noise suppressor of claim 1 wherein said noise component subtractor comprises a processor having an algorithm executable therein for subtracting the values of the noise component estimate signal from the signal indicative of the receive signal.

10. The noise suppressor of claim 1 wherein the receive signal comprises an acoustic signal applied to an acoustic transducer, the acoustic transducer for converting the acoustic signal into an electrical signal, and wherein the signal indicative of the receive signal to which said noise component estimator is coupled to receive comprises the electrical signal into which the acoustic transducer converts the acoustic signal.

11. The noise suppressor of claim 10 wherein the acoustic transducer comprises a microphonic portion of a radiotelephonic device and wherein said noise component estimator form portions of the radiotelephonic device.

12. The noise suppressor of claim 1 wherein the receive signal comprises an electromagnetic signal applied to an electromagnetic transducer, the electromagnetic transducer for converting the electromagnetic signal into an electrical signal, and wherein the signal indicative of the receive signal to which said noise component estimator is coupled to receive comprises the electrical signal into which the electromagnetic transducer converts the electromagnetic signal.

13. The noise suppressor of claim 12 wherein the electromagnetic transducer comprises an antenna element of a radiotelephonic device and wherein said noise component estimator and said noise component subtractor form portions of the radiotelephonic device.

* * * * *

UNITED STATES PATENT AND TRADEMARK OFFICE
CERTIFICATE OF CORRECTION

PATENT NO. : 5,903,819
DATED : May 11, 1999
INVENTOR(S) : Eric Douglas Romesburg

It is certified that error appears in the above-identified patent and that said Letters Patent is hereby corrected as shown below:

In the drawings, Sheet 4, Fig. 5, signals generated by the plurality of estimate generators are summed together by a summer 216A. A summed signal generated by the summer 216A is coupled to line 217 upon which the summed signal generated by the summer 216A is generated.

Signed and Sealed this

Ninth Day of January, 2001

Q. TODD DICKINSON

*Attest:*

*Attesting Officer*

*Commissioner of Patents and Trademarks*

UNITED STATES PATENT AND TRADEMARK OFFICE

CERTIFICATE OF CORRECTION

PATENT NO. : 5,903,819

DATED : May 11, 1999

INVENTOR(S) : Eric Douglas Romesburg

It is certified that error appears in the above-identified patent and that said Letters Patent is hereby corrected as shown below:

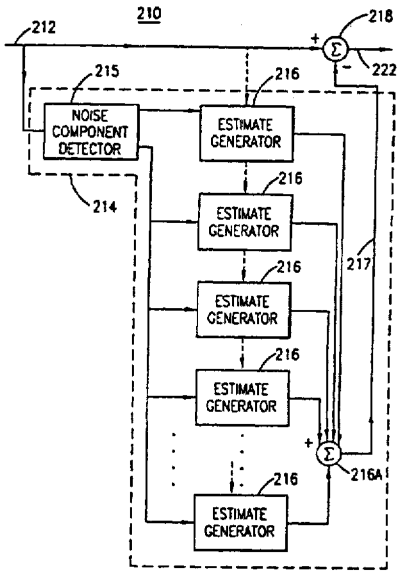

*FIG. 5*